(12) United States Patent
Sheintuch et al.

(10) Patent No.: US 8,980,104 B2
(45) Date of Patent: Mar. 17, 2015

(54) ACTIVATED CARBON CLOTH-SUPPORTED BIMETALLIC PD-CU CATALYSTS FOR NITRATE REMOVAL FROM WATER

(75) Inventors: Moshe Sheintuch, Haifa (IL); Uri Matatov-Meytal, Or Akiva (IL)

(73) Assignee: Technion Research and Development Foundation Ltd., Haifa (IL)

( * ) Notice: Subject to any disclaimer, the term of this patent is extended or adjusted under 35 U.S.C. 154(b) by 623 days.

(21) Appl. No.: 13/319,173

(22) PCT Filed: May 4, 2010

(86) PCT No.: PCT/IL2010/000360
§ 371 (c)(1),
(2), (4) Date: Jan. 19, 2012

(87) PCT Pub. No.: WO2010/128505
PCT Pub. Date: Nov. 11, 2010

(65) Prior Publication Data
US 2012/0111802 A1    May 10, 2012

Related U.S. Application Data

(60) Provisional application No. 61/175,537, filed on May 5, 2009.

(51) Int. Cl.
*C02F 1/70* (2006.01)
*B01J 21/18* (2006.01)
(Continued)

(52) U.S. Cl.
CPC .............. *B01J 23/8926* (2013.01); *C02F 1/705* (2013.01); *B01J 23/44* (2013.01); *B01J 23/72* (2013.01);
(Continued)

(58) Field of Classification Search
CPC ............ C02F 1/28; C02F 1/283; C02F 1/288; C02F 1/70; C02F 1/725; C02F 2101/16; C02F 2101/163; C02F 2101/166; C02F 2103/34; C02F 2103/36; C02F 2103/365; C02F 2209/15; B01J 21/18; B01J 23/44; B01J 23/72; B01J 23/8962; B01J 35/0053; B01J 35/006; B01J 35/0066; B01J 37/0205; B01J 37/0207; B01J 37/0211; B01J 37/0213; B01J 37/0228; B01J 37/0234; B01J 37/0236; B01J 37/024; B01J 2523/17; B01J 2523/824
USPC .............. 210/757, 758, 763, 502.1, 503, 504, 210/505, 507, 508, 509; 502/184, 185, 326, 502/330, 331, 345, 439
See application file for complete search history.

(56) References Cited

U.S. PATENT DOCUMENTS 4,990,266 A    2/1991   Vorlop et al.
5,122,496 A    6/1992   Vorlop et al.

OTHER PUBLICATIONS

Batista J., Pintar A., Ceh M., Characterization of supported Pd-Cu bimetallic catalysts by SEM,EDXS, AES and catalytic selectivity measurements, Catalysis Letters, 1997, pp. 79-84, vol. 43, J.C. Baltzer AG, Science Publishers.
(Continued)

*Primary Examiner* — Lucas Stelling
(74) *Attorney, Agent, or Firm* — Browy and Neimark, PLLC

(57) ABSTRACT

An activated carbon cloth-supported bimetallic Pd—Cu nanocatalyst is disclosed comprising about 1 wt % Pd and about 0.35-0.45 wt % Cu and having a surface Cu/Pd metal ratio of about 8-10 $m^2/m^2$. The nanocatalyst is capable of removing nitrate and/or nitrite from wastewater with a high selectivity to nitrogen.

12 Claims, 1 Drawing Sheet

(51) Int. Cl.
　　B01J 23/44　　(2006.01)
　　B01J 23/72　　(2006.01)
　　B01J 23/89　　(2006.01)
　　B01J 37/02　　(2006.01)
　　B01J 35/06　　(2006.01)
　　B01J 35/00　　(2006.01)
(52) U.S. Cl.
　　CPC .............. *B01J 21/18* (2013.01); *B01J 35/0053* (2013.01); *B01J 35/06* (2013.01); *B01J 37/0238* (2013.01); *B01J 37/024* (2013.01); *C02F 1/70* (2013.01); *B01J 35/006* (2013.01); *B01J 35/0066* (2013.01)
　　USPC ........ 210/757; 210/502.1; 210/504; 210/505; 210/507; 502/184; 502/185; 502/326; 502/331; 502/345

(56) References Cited

OTHER PUBLICATIONS

Daganello F., Liotta L.F., Macaluso A., Venezia A.M., Daganello G., Catalytic reduction of nitrates and nitrites in water solution on pumice-supported Pd Cu-catalysts, Applied Catalysis B: Environmental 24, 2000, pp. 265-273, vol. 24, Elsevier Science B.V.

Gao W., Guan N., Chen J., Guan X., Jin R., Zeng H., Liu Z., Zhang F., Titania supported Pd-Cu bimetallic catalysts for the reduction of nitrate in drinking water Applied Catalysis B. Environmental, 2003, pp. 341-351, vol. 46.

Gavagnin R., Biasetto L., Pinna F., Strukul G., Nitrate removal in drinking waters: the effect of tin oxides in the catalytic hydrogenation of nitrate by Pd/SnO2 catalysta Applied Catalysis B: Environmental, 2002, pp. 91-99, vol. 38, Elsevier Science B.V.

Horold S., Vorlop K. D., Tacke T., Sell M., Development of catalysts for a selective nitrate and nitrite removal from drinking water, Catalysis Today, 1993, pp. 21-30, vol. 17, Elsevier Science Publishers B.V.

Kapoor A. and Viraraghavan T., Nitrate removal from drinking water, Journal of Environmental Engineering, 1997, pp. 903-905, vol. 371, ASCE.

Kralik M. and Biffis A., Catalysis by metal nanoparticles supported on functional organic polymers, Journal of Moleular Catalysis A: Chemical, 2001, pp. 113-138, vol. 177, Elsevier Science B.V.

Lemaignen L., Tong C., Begon V., Burch R., Chadwick D., Catalytic denitrication of water with palladium-based catalysts supported on activated carbons, Catalysis Today, 2002, pp. 43-48, vol. 75, Elsevier Science B.V.

Matatov-Meytal Yu., Barleko V., Yuranov I., Kiwi-Minsker L., Renken A., Sheintuch M., Cloth catalysts for water denitrification II . Removal of nitrates using Pd-Cu supported on glass fibers, Applied Catalysis B: environmental, 2001, pp. 233-240, vol. 31, Elsevier Science B.V.

Matatov-Meytal U. and Sheintuch M.,Proceedings of the First International Symposium on Carbon for Catalysis, Jul. 18-20, 2004—CarboCat, Lausanne, Switzerland,—only editorial.

Pintar A., Batista J., Levec J., Potential of mono- and bimetallic catalysts for liquid-phase hydrogenation of aqueous nitrate solution, Water Sci. Tech, 1998, pp. 177-185, vol. 37, No. 8, Elsevier Science Ltd.

Pintar A., Setinc M., Levec J., Kajiuchi T., J. Catal. , Hardness and Salt Effects on Catalytic Hydrogenation of Aqueous Nitrate Solutions, Journal of Catalysis, 1998, pp. 72-87, vol. 174, Academic Press.

Prusse M., Horold S., Vorlop K. D., Effect of the preparation conditions on catalytic properties of bimetallic catalyst for nitrate removal from water, Chemie Ingenieur Technik, 1997, pp. 93-97, vol. 69.

Prusse M. and Vorlop K. D., Supported bimetallic palladium catalysts for water-phase nitrate reduction, Journal of Molecular Catalysis A: Chemical, 2001, pp. 313-328, vol. 173, Elsevier Science B.V.

Shindler Y, Matatov-Meytal YU., Sheintuch M., Wet Hydrodechlorination of p-Chlorophenol using Pd Supported on Activated Carbon Cloths, Ind. Eng. Chem. Res., 2001, pp. 3301-3308, vol. 40 American Chemical Society.

Strukul G., Pinna F., Marella M., Maregalli L., Tomaselli M., Sol-gel Pd catalysts for nitrate/nitrite removal from drinking water, Catalysis Today, 1996, 209-214, vol. 27, Elsevier Science B.V.

Vorlop K. D. and Prusse M., Catalytic removing nitrate from water, Catal. Sci. Ser. , 1999, pp. 195-218, Environmental Catalysis.

Yoshinaga Y., Akita T., Mikami I., Okura T., Hydrogenation of Nitrate in Water to Nitrogen over Pd-Cu Supported on Active Carbon, Journal of Catalysis, 2002, pp. 37-45, vol. 207, Elsevier Science.

Pintar et al., Kinetics of the catalytic liquid-phase hydrogenation of aqueous nitrate solutions, Applied Catalysis B: Environmental, 1996, pp. 81-98, vol. 11, No. 1, Elsevier Science B.V.

Matatov-Meytal et al., Cloth catalysts in water denitrification I. Pd on glass fibers, Applied Catalysis B Environmental 27, 2000, pp. 127-135, Elsevier Science B.V.

Matatov-Meytal U et al; "Cloth catalysts in water denitrification: III. pH inhibition of nitrite hydrogenation over Pd/ACC," Applied Catalysis B: Environmental 45 pp. 127-134. (2003).

Matatov-Meytal U; "Radial-Flow Reactor Packed with a Catalytic Cloth: Nitrate Reduction in Hydrogen-Saturated Water" Industrial & Engineering Chemistry Research, vol. 44, Issue 25, pp. 9575-9580 (2005).

Matatov-Meytal U et al; "The relation between surface composition of Pd-Cu/ACC catalysts prepared by selective deposition and their denitrification behavior" Catalysis Communications 10, pp. 1137-1141. (2009).

Matatov-Meytal U et al; "Activated carbon cloth-supported pd-cu catalyst: Application for continuous water denitrification" Catalysis Today 102-103, pp. 121-127.(2005).

Barrabés et al; "Catalytic reduction of nitrate on Pt-Cu and Pd-Cu on active carbon using continuous reactor: The effect of copper nanoparticles" Applied Catalysis B: Environmental vol. 62, Issues 1-2, pp. 77-85. (2006).

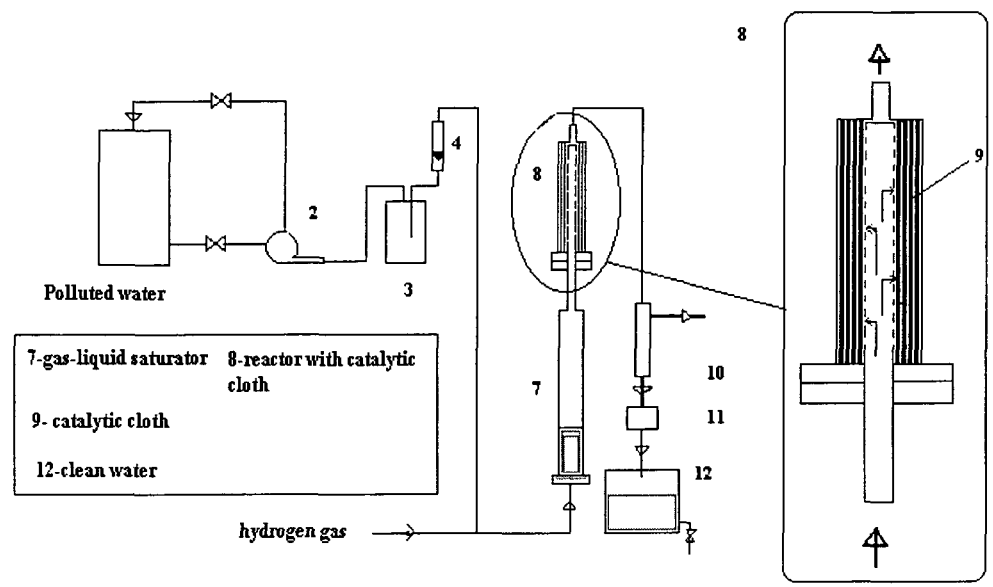

ACTIVATED CARBON CLOTH-SUPPORTED BIMETALLIC PD-CU CATALYSTS FOR NITRATE REMOVAL FROM WATER

FIELD OF THE INVENTION

The present invention relates to catalysts for treating water and, in particular, to bimetallic hydrogenation catalyst for removal of nitrate and nitrite ions from wastewater streams.

BACKGROUND OF THE INVENTION

Wastewaters of many industrial plants (e.g. upgrading of uranium, production of fertilizers and explosives, nitro-organic compounds and pharmaceuticals) are nitrate bearing wastes. The use of nitrogen fertilizers and irrigation with domestic wastewaters are the main sources of nitrate pollution of groundwater in many developed and developing countries. Nitrate is one of the most problematic and widespread among the groundwater contaminants. The toxicity of nitrates to humans is due to the body's reduction of nitrate to nitrite that is related to clinical cyanosis (blue baby syndrome) and is a precursor of carcinogenic nitrosamines. Chronic consumption of high levels of nitrate may also cause other health problems, for example, some cancers and teratogenic effects. Due to the harmful effects of the nitrate ion, the European and US legislations have established the maximum admissible concentration for nitrates and nitrites in drinking water as 50 mg/l and 0.1 mg/l, respectively. The World Health Organization (WHO) recommends a maximum concentration for nitrate, nitrite and ammonium of 45 mg/l, 0.1 mg/l and 0.5 mg/l, respectively.

Most nitrate salts are soluble in aqueous medium so that nitrate ions are easily distributed to the groundwater sources. Standard water treatment practices, such as sedimentation, filtration, chlorination or pH adjustment with lime application, do not affect nitrate concentrations in water. Nitrates from contaminated groundwater can be removed by available physico-chemical methods for nitrate separation such as ion exchange, reverse osmosis and electrodialysis. In these processes the nitrates are concentrated in secondary waste streams which must be treated and thus result in high process costs.

A popular feasible method to solve the nitrate problem is biodenitrification. However, microbial denitrification processes are slow, sometimes incomplete and not easy to handle. Moreover, by direct biological denitrification the waters are intimately mixed with microbial cultures and organic compounds must be supplied as an energy source to drive the denitrification reaction. Residual organics may lead to other water quality problems.

Chemical reduction of nitrates can be conducted using various compounds, which are mainly hydrogen, iron, formic acid and aluminum. The main disadvantage of chemical reduction of nitrate is the production of additional wastes, which must be removed with a following treatment.

The catalytic hydrogenation of nitrates is viewed as a promising technology for removal of nitrates from polluted water. The hydrogenation process can be described by consecutive and parallel chemical equations 1a, 1b and 1c below:

$$NO_3^- + H_2 \rightarrow NO_2^- + H_2O \quad (1a)$$

$$2NO_2^- + 3H_2 \rightarrow (NO, N_2O) \rightarrow N_2 + 2H_2O + 2OH^- \quad (1b)$$

$$NO_2^- + 3H_2 \rightarrow NH_4^+ + 2OH^- \quad (1c)$$

These equations show that the nitrates undergo hydrogenation to nitrites and then to gaseous nitrogen (target product) and dissolved ammonia (undesired by-product).

A continuously performable process for the removal or reduction of the nitrite and/or nitrate content of nitrite-polluted and/or nitrate-polluted water with the selective formation of nitrogen by catalytic hydrogenation was first disclosed in U.S. Pat. No. 4,990,266. In U.S. Pat. No. 5,122,496, which is a divisional of U.S. Pat. No. 4,990,266, a catalyst is disclosed made from a porous inorganic carrier material, e.g. powdered alumina or silica impregnated with a metal component selected from palladium, rhodium, mixtures of palladium and rhodium, and mixtures of palladium and a metal of the copper group, preferably Cu. However, the use of powdered catalyst is restricted by a high-pressure drop in fixed beds and by the difficulty of separation of suspended powder catalysts. In addition, reduction of nitrate in water demands very active catalysts because the reaction has to be performed at the temperature of the groundwater (e.g. 25° C.). Moreover, a high selectivity is necessary to avoid the production of nitrite and ammonium ions by over-reduction of nitrite hydrogenation.

Several catalysts and supports have been investigated recently for catalytic denitrification of polluted water. Most of the hydrogenation catalysts (supported noble and transition metals) reduce nitrite mainly to ammonia. Both products (gaseous nitrogen and dissolved $NH_4^+$) were observed with Pd and Pt catalysts. Only supported Pd showed a high nitrite reduction activity and a low formation of ammonia. It was found to be a poor catalyst for the hydrogenation of nitrates, which was found to be accelerated by adding a metal promoter (Cu, Sn, In, or Zn) to Pd [Horold et al., 1993; Pintar et al., 1998; Vorlop and Prusse, 1999]. The efficiency of bimetallic catalyst depends on the ratio of the two metals [Kapoor and Viraraghavan, 1997] and on the catalyst preparation procedure [Vorlop and Prusse, 1999; Prusse et al., 1997; Batista et al., 1997]. The highest activity was observed for a Pd:Cu catalyst supported on powdered alumina (particles of 25 μm in size) with a ratio Pd:Cu of 4:1. The highest reaction selectivity was obtained for the bimetallic catalyst sample in which the copper was coated by a Pd layer [Batista et al., 1997]. Similar behavior was also reported for Pd—Cu sphere-shaped bimetallic catalysts with unimodal mesoporosity (pore radius of 3 nm) prepared by the sol-gel procedure [Strukul et al., 1996]. The obtained reaction selectivity was as low as 60-75%, probably due to inappropriate textural properties of these materials [Matatov-Meytal et al., 2000].

Significant effort has been devoted for preparation and optimization of catalysts for this process. It has been shown that while single noble metals (Pd, Pt) are active only with respect to nitrite hydrogenation, many supported noble metals with a metal promoter (Cu, Sn, In) show satisfactory performance for conversion of dissolved nitrate ions [Prusse and Vorlop, 2001]. The Pd—Cu catalyst suggested by Horold and Vorlop [Horold and Vorlop, 1993; U.S. Pat. No. 5,122,496] is still considered to be the best catalyst for this process.

It is known that the activity and selectivity of the bimetallic catalyst in nitrate hydrogenation is highly dependent on the preparation method, mode of noble metal promoting, metal-promoter ratio as well as operation conditions [Matatov-Meytal and Sheintuch, 2005]. The selection of the support material is also important and several materials have been proposed as support for Pd—Cu catalysts: silica and alumina [Vorlop and Prusse, 1999; Pintar et al., 1998], zirconia [Gavagnin et al., 2002], titania [Gao et al., 2003], polymers [Kralic and Biffis, 2001], granular active carbon [Yoshinaga et al., 2002; Lemaignen et al., 2002] and other materials [Daganello et al., 2000], and found to greatly affect the catalyst's activity and selectivity towards the reaction products. There is currently a growing interest in using novel structured supports like monoliths, foams, membranes as well as fibrous cloths [Matatov-Meytal and Sheintuch, 2005] as support for bimetallic catalysts. Cloths woven from thin μm-sized fibers reduce the diffusion distance and produce a low-pressure drop in fixed beds and in multi-phase reactors in which one or more dissolved species have to react with gaseous compounds of limited solubility. Moreover, cloth-type catalysts are preferable to monoliths when rapid fluctuations in the flow regime occur, as often-encountered in applications for environmental protection.

Recently, the inventors of the present invention have studied some novel Pd-based catalytic cloths for hydrodechlorination [Shindler et al., 2001] and for nitrite and nitrate hydrogenation [Matatov-Meytal et al., 2003; Matatov-Meytal and Sheintuch, 2005, 2009; Matatov-Meytal, 2005]. In this aspect, particular attention was given to activated carbon cloths, that have been proven to have a great potential as a catalytic support, especially for the expensive noble metals, since a high metal loading and dispersion can be achieved.

In spite of the many efforts that have been devoted to developing a catalyst for direct removal of nitrate and nitrites from nitrate-polluted water streams into nitrogen, stable catalysts with adequate both nitrate removal efficiency and selectivity towards nitrogen production have not yet been produced. The main reasons which inhibit the use of the catalytic hydrogenation as an effective water denitrification technology are the difficulty to modulate the activity of the existing catalysts and their selectivity to avoid nitrite and ammonium formation. Therefore, there still exists a need for a catalyst to convert nitrate and simultaneously nitrite into nitrogen gas

SUMMARY OF THE INVENTION

It has now been found, in accordance with the present invention that an improved bimetallic Pd—Cu catalyst for removal of nitrate from waste water with higher selectivity to nitrogen can be obtained by modifying the composition and the surface Cu/Pd metal ratio of the catalyst.

The present invention thus relates to an activated carbon cloth-supported bimetallic Pd—Cu nanocatalyst comprising about 1% Pd and about 0.35-0.45% Cu and having a surface Cu/Pd metal ratio of about 8-10 $m^2/m^2$.

The present invention further relates to a method for denitrification of wastewater with selective reduction of nitrate to nitrogen, comprising contacting the wastewater with an activated carbon cloth-supported bimetallic Pd—Cu nanocatalyst of the invention.

BRIEF DESCRIPTION OF THE DRAWINGS

FIG. 1 shows a schematic diagram of the experimental nitrate hydrogenation set-up in continuous flow system:

DETAILED DESCRIPTION OF THE INVENTION

As described in the Background section of the present application, much effort has been devoted for developing catalysts for direct removal of nitrates and nitrites from nitrate-polluted water streams to nitrogen. However, there still exists a need to provide such a catalyst that is stable and capable of converting nitrate and simultaneously nitrite into nitrogen gas, avoiding the formation of nitrite and ammonium.

The activated carbon cloth-supported bimetallic Pd—Cu nanocatalyst of the present invention comprises about 1 wt % Pd and about 0.35-0.45wt % Cu and has a surface Cu/Pd metal ratio of about 8-10 $m^2/m^2$.

In one preferred embodiment, the bimetallic Pd—Cu nanocatalyst comprises 1 wt % Pd and 0.35wt % Cu. In another preferred embodiment, the bimetallic Pd—Cu nanocatalyst comprises 1 wt % Pd and 0.45 wt % Cu.

In order to be active and selective, the surface of the supported metal nanoparticles must be optimized for their size as well as for surface ratio of connected PdCu to free Pd, i.e., surface Cu/Pd, $m^2/m^2$) in supported metal particles. According to the invention, the surface Cu/Pd metal ratio is about 8-10 $m^2/m^2$, more preferably close to 8 $m^2/m^2$.

In a more preferred embodiment of the invention, the bimetallic Pd—Cu nanocatalyst comprises about 1 wt % Pd and about 0.355wt % Cu and has a surface Cu/Pd metal ratio of about 8 $m^2/m^2$.

The nanocatalyst of the invention is capable of removing nitrate and/or nitrite from wastewater selectively in the form of nitrogen. In one embodiment, the nanocatalyst converts the nitrate in wastewater to at least about 96% nitrogen, for example, in the range 96-99%, preferably from 98.4% to 98.9%. In the denitrification process, the nitrate is converted simultaneously to less than 0.2% nitrite and less than 1.4% ammonia.

The special characteristics of the bimetallic Pd—Cu nanocatalyst of the invention are obtained by the particular method for its preparation disclosed herein, which comprises the steps:

(i) incipient wetness impregnation of activated carbon cloth (ACC) with an aqueous solution of palladium (II) nitrate, drying, calcining and reducing the sample under flowing hydrogen, thus obtaining a monometallic Pd/ACC catalytic cloth; and (ii) sputter deposition of a solution of copper formate on the Pd/ACC cloth of step (i), and drying.

After the impregnation in step (i), the solid impregnated cloth is left at room temperature for about 6 h, dried during about 12 h at 70° C., calcined at about 300° C. in flowing nitrogen, and reduced at about 200° C. under flowing hydrogen. In step (ii), the solution of copper formate is sputtered on the monometallic Pd/ACC catalytic cloth obtained in step (i), the solid bimetallic catalytic cloth is left at room temperature for about 12 h, dried during about 12 h at 100° C., calcined at about 300° C. in flowing nitrogen, washed and dried overnight at about 90° C. under nitrogen.

The invention further relates to a method for denitrification of wastewater with selective reduction of nitrate to nitrogen, comprising contacting the waste water with a bimetallic Pd—Cu nanocatalyst according to the invention.

FIG. 1 shows a schematic diagram of the experimental nitrate hydrogenation set-up in continuous flow system used in the experiments below. In the diagram: 1-feed tank, 2-hydrogen cylinder, 3-liquid pump, 4-damping and heat/exchanger vessel, 5-liquid flow meter, 6-gas mass-flow controller, 7-back-pressure regulator; 8-autoclave, 9-inert fixed bed 10- radial flow reactor, 11-pressure reducer, 12-gas-liquid separator with vent, 13-liquid sample port.

The invention will now be illustrated by the following non-limiting Examples.

EXAMPLES

Experimental Procedures

Example 1

Preparation of Monometallic Pd Woven Fibrous Cloths

Noble metals such as Pd, Pt, Ir can be deposited on carbonaceous support by various methods. Below we describe 3 different methods for deposition of Pd, the first metallic component of the bimetallic catalyst Pd—Cu of the invention, onto woven fibrous cloths.

1.1 Method 1

Woven fibers glass cloths (GFC) woven from 10-12 cm long threads from elementary fibers were employed as catalyst carrier (GFC YO212 from Fothergil Engineered Fabrics, UK) cloths Pd—Cu of mponentsited on carbonaceous support by various methods tential as a catalytic support[14] The basic characteristics of elementary fibers (alumoborosilicalite with about 55% silica) are the following: 7-9 µm in diameter, BET specific surface area (BET ssa) of 2-10 m$^2$/g. Low surface area GFCs were pretreated in aqueous solution of HCl, leaching out the non-silica component after that BET ssa became 30-100 m$^2$/g. These GFCs were also modified by thin layer of $Al_2O_3$ (AFC) or $SnO_2$ (SFC); these oxides roughen the fiber surface and create higher porosity for GFC.

Pd was incorporated on GFC, AFC or SFC via the ion-exchange method using $H_2PdCl_4$ (from solution of $PdCl_2$ (Fluka) in hydrochloric acid) of appropriate concentration. Then GFC was heated first at 80° C. overnight and calcined at 450° C. for 4 h in air. The calcined samples were washed to remove chloride ions, which originated from the decomposition of $H_2PdCl_4$ during calcination. Final concentration of chloride ions in rinsing waters was detected using $AgNO_3$/$HNO_3$. After drying at 120° C. for 3 h, the samples were reduced at 180° C. for 1-1.5 h under flowing hydrogen.

1.2 Method 2

Activated carbon cloth (ACC from Nippon Kynot™) woven from activated carbon fiber ACF-15 was employed as catalyst carrier. The basic characteristics of ACF-15 are the following: 9-10 µm in diameter, BET ssa of 1540 m$^2$/g; the micropore volume and the average pore diameter were reported as 0.605 ml/g and 1.61 nm, respectively. The commercial ACC was thoroughly rinsed with water to remove carbon dust, and then dried in air at 70° C. It was treated with aqueous solution of $HNO_3$ (4.5 wt. %) for 8 h and then rinsed with distilled water followed by additional water flushing and drying in air.

Pd was deposited onto ACC by wet impregnation method using $H_2PdCl_4$ (dihydrogen tetrachloropalladate (II)) from solution of $PdCl_2$ (pure, Fluka) in hydrochloric acid) of appropriate concentration and impregnation was terminated at residual $H_2PdCl_4$ concentrations that correspond to Pd loading in the range of 0.25-5.0 wt. %. After impregnation, ACC was heated first at 80° C. overnight to eliminate solvent and then calcined at 350° C. for 4 h in flowing nitrogen. The calcined samples were washed to remove chloride ions, which originated either from the impregnating solution or from decomposition of $H_2PdCl_4$ during calcination. Final concentration of chloride ions in rinsing waters was detected using $AgNO_3$/$HNO_3$. After drying at 120° C. for 3 h, the samples were reduced at 200° C. for 1-1.5 h under flowing hydrogen.

1.3 Method 3

The ACC carrier (same as used in Method 2 above) was thoroughly rinsed with water to remove carbon dust and then dried in air at 80° C. Pd/ACC was prepared by incipient wetness impregnation of ACC with an aqueous solutions of palladium (II) nitrate ($Pd(NO_3)_2$, Fluka) of appropriate concentration. The volume of solution was 0.85 ml/g ACC, which represented 10% excess with respect to the pore volume of the ACC. After impregnation, the solid was left 6 h at room temperature, dried during 12 h at 70° C. and calcined at 300° C. for 5 h in flowing nitrogen. Then the samples were reduced at 200° C. for 1-2 h under flowing hydrogen.

Example 2

Preparation of Bimetallic Pd:Cu Woven Fibrous Cloths

The copper must be deposited on the supported noble metal Pd prepared according to Example 1 above only by methods that provide formation of bimetallic particles. Below we describe two methods for selective deposition of Cu (as second metal component) onto Pd/ACC of Example 1 (as first supported metal).

2.1 Method 1

A given amount of selected Pd/cloth (prepared by methods 1.1-1.3) was placed on a rotating drum and immersed into a solution of copper formate ($Cu(HCO_2)_2$, reagent grade Aldrich) under flowing nitrogen. The copper formate catalytically decomposes at the surface of Pd particles even at room temperature, generating the metallic Cu at the metallic Pd surface. The Cu metal loading on the metallic Pd surface can be varied by modification of deposition time or concentration of copper formate. The solution was regularly monitored spectrophotometrically at $\lambda_{max}$=778 nm for presence of copper ions in solution. Then the cloth was separated from the liquid and dried overnight under nitrogen at 90° C.

2.2 Method 2

A solution of copper formate ($Cu(HCO_2)_2$, reagent grade Aldrich) at required concentration was sputtered on selected Pd/cloth. The Cu loading on the metallic Pd surface can be varied by concentration of the copper salt in solution with respect to the pore volume of the Pd/cloth. After sputtering, the wet solid was left for 12 h at room temperature and dried during 12 h at 100° C. in flowing nitrogen. Then the Pd—Cu cloth was thoroughly washed with deionized water to remove copper ions (by controlling the concentration of copper ions in rinsing waters spectrophotometrically at $\lambda_{max}$=778 nm). Then the cloth was dried overnight under nitrogen at 90° C.

Example 3

Characterization of Monometallic and Bimetallic Woven Fibrous Cloths

The specific surface area of the monometallic and bimetallic woven fibrous catalysts was measured by BET method using $N_2$ adsorption-desorption at −196° C. via an ASAP 2010 (Accelerated Surface Area and Porosimetry System, Micromeritics). The values of pH at the point of zero charge (pzc, i.e. the pH value at which the total surface of the support is electroneutral) were determined by the batch equilibrium pH drift method. In order to determine the metal content in the prepared samples, the samples were dissolved in concentrated $HNO_3$ and analyzed by inductively coupled plasma emission spectrometry (ICP-ES, Perkin-Elmer Optima 3000 DV) instrument. Prepared samples were characterized using high resolution scanning electron microscopy (HRSEM) and CO-chemisorption. The surface observation of metallic particles on prepared catalytic cloths was carried out with field emission gun high-resolution digital scanning electron microscope HR SEM LEO 982 (co-operation Zeiss-Leica) and SEM/EDS using JEOL 5400 microscope with X-ray detector for microanalysis (Noran Instrument Co.). The average crystallite sizes $d_s$ (nm) were calculated using Eq. 2 from values of the individual particles size $d_i$ obtained from HRSEM:

$$d_s = \frac{\Sigma n_i d_i^3}{\Sigma n_i d_i^2} \qquad \text{Eq. (2)}$$

where $n_i$ is the number of particles with diameter $d_i$.

The values of specific surface area of Pd atoms exposed to the metallic particle surface ($S_{Pd}$ m²/g cat.) and dispersion of palladium $D_{Pd}$ were estimated from CO chemisorption results under the assumption that CO was partly chemisorbed in a linear form and partly in a bridged form, according to Eq. 3 and Eq. 4. CO-chemisorption measurements were performed on an "ASAP 2010 Chemi" Micromeritics apparatus. The samples were dried under vacuum ($10^{-6}$ Torr) at 150° C. over 30 min, reduced at 100° C. (10° C. min$^{-1}$) for 1 h and evacuated prior taking the CO isotherms at room temperature over the pressure range 50-300 Torr of CO. Before the measurements, the samples after evacuation were reduced in a stream of $H_2$ at 100° C. (10° C. min$^{-1}$) for 1 h to avoid the formation of β-PdH. The CO isotherms were taken at room temperature over the pressure range 50-300 Torr of CO.

$$D_{Pd} = \frac{V_{CO} M_{Pd} X_{Pd-CO}}{22414 f_{Pd}} \qquad \text{Eq. (3)}$$

$$S_{Pd} = \frac{2.7 \times 10^{15} V_{CO} X_{Pd-CO}}{P_{Pd}} \qquad \text{Eq. (4)}$$

where $M_{Pd}$ is the atomic weight of Pd (106.4 g/mol), $f_{Pd}$ is the weight fraction of Pd ($m_{Pd}/m_{cat}$); the constant 22414 refers to molar density (cm³/mol), $P_{Pd}$ is the surface density of palladium atoms ($1.27 \times 10^{15}$ atom/cm²) and $X_{Pd-CO}$ is Pd—CO chemisorption stoichiometry, which equals 1.25.

Table 1 shows the average particle sizes, accessible metallic Pd surface and the Pd dispersion (ratio of exposed Pd atoms on the metal particle surface to the total number of Pd atoms) for Pd supported particles prepared according to Methods 1.2 and 1.3 above.

TABLE 1

Characteristics of Pd/ACC catalysts

| Sample | Preparation Method | $d_s$ (nm) | $D_{Pd}$ | $S_{Pd}$ (m²/g cat) |
|---|---|---|---|---|
| 0.5% Pd/ACC | 1.2 | 2.0 | 0.29 | 0.65 |
| 1.0% Pd/ACC | 1.2 | 2.2 | 0.24 | 0.90 |
| 1.0% Pd/ACC | 1.3 | 3.9 | 0.28 | 0.90 |
| 2.0% Pd/ACC | 1.2 | 2.5 | 0.21 | 1.9 |
| 2.0% Pd/ACC | 1.3 | 5.8 | 0.20 | 1.9 |
| 4.0% Pd/ACC | 1.2 | 5.4 | 0.18 | 2.3 | error ±3% (by taking into account the error on sample weighing, reaction tests and analyses).

Table 2 shows the average particle sizes, the accessible metallic Pd surface and the Pd dispersion for Pd—Cu supported particles in PdCu/ACC samples obtained by different preparation sequences (i.e. preparation sequence 3-2 refers to PdCu/ACC obtained using Pd deposition method 1.3 and Cu deposition method 2.2). The selective deposition of Cu on Pd/ACC (Table 2) led to an increase of mean particle size $d_s$ that, in turn, led to decline in palladium dispersion ($D_{Pd}$), indicating the presence of surface Pd atoms even at high Cu coverage. Furthermore, higher deposition of Cu on Pd/ACC was accompanied by declining the surface of Pd atoms ($S_{Pd}$).

TABLE 2

Characteristics of Cu—Pd catalyst samples

| Sample | Preparation Sequence (numbers refer to aforementioned methods) | $d_s$ (nm) | $S_{Pd}$ (m²/g) | $S_M$ (m²/g) | $D_{Pd}$ |
|---|---|---|---|---|---|
| 2 wt % Pd—0.28 wt % Cu | 3-2 | 3.1 | 1.0 | 1.9 | 0.11 |
| 2 wt % Pd—0.28 wt % Cu | 2-1 | 3.9 | 1.0 | 1.9 | 0.14 |
| 2 wt % Pd—0.59 wt % Cu | 3-2 | 5.7 | 0.4 | 1.2 | 0.04 |
| 2 wt % Pd—0.59 wt % Cu | 2-1 | 6.7 | 0.4 | 1.2 | 0.05 |
| 2 wt % Pd—1.20 wt % Cu | 3-2 | 10.2 | 0.2 | 0.9 | 0.02 |
| 2 wt % Pd—1.20 wt % Cu | 2-1 | 11.8 | 0.2 | 0.9 | 0.025 |
| 2 wt % Pd—1.80 wt % Cu | 2-1 | 18.9 | 0.1 | 0.6 | 0.09 |
| 2 wt % Pd—1.80 wt % Cu | 2-2 | 20.7 | 0.1 | 0.6 | 0.11 |
| 1 wt % Pd—0.10 wt % Cu | 3-2 | 3.4 | 0.31 | — | 0.140 |
| 1 wt % Pd—0.30 wt % Cu | 3-2 | 5.2 | 0.18 | — | 0.065 |
| 1 wt % Pd—0.35 wt % Cu | 3-2 | 5.6 | 0.10 | — | 0.053 |
| 1 wt % Pd—0.40 wt % Cu | 3-2 | 6.8 | 0.08 | — | 0.045 |
| 1 wt % Pd—0.6 wt % Cu | 3-2 | 8.5 | 0.04 | — | 0.031 |

Example 4

Nitrate Catalytic Hydrogenation

The nitrate hydrogenation runs to measure the activity and selectivity of the prepared catalysts were carried out in lab-scale test unit constructed according to FIG. 1. In a typical run, prior to entering into the catalytic reactor 10 (home-made tubular cartridge in which the catalytic cloth can be spirally wound around a central cylindrical core), a solution of nitrate (from NaNO$_3$) in distilled or tap water was fed into the gas/water saturator/autoclave 8 in which H$_2$ was dissolved in feed solution under pressure.

The primary result of each hydrogenation run in the flow reactor is the reactant/products distribution curve in reactor outlet as a function of time. Catalytic performance is characterized by nitrate conversion ($X_{NO3}$) and by the selectivity to nitrogen, nitrite or ammonium ions ($S_i$), as defined in Eqs. 5-7:

$$X_{NO3} = (1 - C_{NO3}/C°_{NO3}) \qquad \text{Eq. (5)}$$

$$S_i = C_i/(C°_{NO3} - C_{NO3}) \qquad \text{Eq. (6)}$$

$$S_{N2} = 1 - S_{NO2} - S_{NH4^+} \qquad \text{Eq. (7)}$$

wherein $C°_{NO3}$ and $C_{NO3}$ are measured influent and effluent molar concentrations of nitrates, respectively, $C_i$ and $S_i$ are the effluent concentrations and selectivity to nitrite and ammonium ions, respectively.

The concentrations of nitrate and nitrite ions were monitored using a liquid ion chromatography (761 Compact IC, Methrom instrument) with electro-conductivity detection (anion analytical column METROSEP A SUPP 4 (4×250 mm); the mobile phase was carbonate/bicarbonate effluent and sulfuric acid regenerant). Ammonium ions concentrations were measured spectrophotometrically with Nessler reagent at $\lambda_{max} = 500$ nm.

The overall nitrate disappearance (conversion) rate r (mmol $NO_3^-$/s g catalyst) was calculated from the nitrate conversion-contact time dependence according to Eq. 8:

$$r=(C°_{NO3}*X_{NO3})F/W_{cat} \quad \text{Eq. (8)}$$

Example 5

Effect of Surface Structure of PdCu Nanoparticles on Nitrate Catalytic Hydrogenation In order to get a better understanding of the chemistry of the catalytic nitrate hydrogenation over Pd—Cu/ACC catalysts, some preliminary experiments had been previously performed by the inventors (Matatov-Meytal and Sheintuch, 2005) and different molecular, ionic and atomic species involved in the process were studied using literature data (numerical values for nitrite and nitrate adsorption constants and rate constants for nitrite and nitrate reduction on Pd and Pd—Cu supported particles) and the modern tools of quantum computer chemistry (Efremenko et al., 2006). This study indicated that:

(a) ACC support for Pd—Cu catalyst provides a higher nitrate removal activity and a higher selectivity to nitrogen than GFC, AFC and SFC;
(b) Pd alone and Cu alone are not suitable to decompose nitrate during catalytic hydrogenation;
(c) Pd in Pd—Cu/ACC becomes active for reduction of nitrate by the addition of only 0.28 wt % Cu (for 2wt % Pd) and change in Cu/Pd ratio had a significant effect on the activity;
(d) Metal loading on the support has a great influence on nitrate removal activity of Pd—Cu/ACC catalysts and should be accounted for catalyst improvement/optimization;
(e) the values of adsorption constants reported for $K^{Pd}_{NO2}/K^{PdCu}_{NO3}$ were of about $0.6\times10^{-3}$ mmol$^{-1}$/$0.08\times10^{-3}$ mmol$^{-1}$~8 (25° C.);
(f) In the range studied (25° C.), ratio of $k^{Pd}_{NO2}/k^{PdCu}_{NO3}$, where $k^{Pd}_{NO2}$ is rate constant (h$^{-1}$ g cat$^{-1}$) for nitrite reduction (removal) over Pd catalyst, and $k^{PdCu}_{NO3}$ (h$^{-1}$ g cat$^{-1}$) is rate constant for nitrate fate over Pd—Cu catalyst, supported on different supports are close to 0.98/0.13~8.

Example 6

Effect of Surface Structure of PdCu Bimetallic Supported Nanoparticles on Nitrate Catalytic Hydrogenation in Flow Reactor The effect of surface composition of PdCu bimetallic supported nanoparticles on denitrification efficiency was examined for 1 wt % Pd—Cu/ACC catalysts prepared by the sequence 3-2 (methods 1.3 and 2.2.) with different Cu content.

Table 3 shows steady state performance data (after at least 6 h of experimentation time) for nitrate hydrogenation over 1% wt Pd—Cu/ACC catalysts at 25° C. Under these conditions, the activity of Pd—Cu/ACC catalysts studied is very high and change in Cu/Pd ratio had a significant effect on the activity and selectivity pass through a local extremum.

It was found that the denitrification conversion rate pass through a local extremum (at $S_{PdCu}/S_{Pd}$ of about 8), while $S_{PdCu}/S_{Pd}$ is close to 8, the yields of nitrite and ammonium ions are minimal.

The process resulted in significant improvement of the catalytic cloth 1% Pd-0.35% Cu/ACC containing only 9% of surface Pd metal and 90% surface Cu—Pd active agents in nitrate decomposition, in particular, for a low content of noble metal, a higher activity per noble metal weight and higher selectivity through nitrite and ammonium.

TABLE 3

Effect of metal surface composition on Pd—Cu/ACC catalysts performance on nitrate hydrogenation.

| Catalyst | Preparation sequence | [a]Surface Cu/Pd metal ratio m$^2$/m$^2$ | [b]$NO_3^-$ conversion | [b]Conversion rate, mmol $NO_3^-$/h g$_{cat}$ (mmol $NO_3^-$/h g$_{Pd}$) | [b]Selectivity, mol % | | |
|---|---|---|---|---|---|---|---|
| | | | | | N$_2$ | $NO_2^-$ | $NH_4^+$ |
| 1 wt % Pd—0.13 wt % Cu | 3-2 | 2 | 0.502 | 0.13(12.6) | 90.8 | 3.8 | 5.4 |
| 1 wt % Pd—0.30 wt % Cu | 3-2 | 4 | 0.677 | 0.17(17.0) | 96.9 | 1.0 | 2.3 |
| 1 wt % Pd—0.35 wt % Cu | 3-2 | 8 | 0.776 | 0.19(19.2) | 98.9 | 0.1 | 1.0 |
| 1 wt % Pd—0.45 wt % Cu | 3-2 | 10 | 0.735 | 0.19(19.0) | 98.4 | 0.2 | 1.4 |
| 1 wt % Pd—0.6 wt % Cu | 3-2 | 22 | 0.652 | 0.16(16.0) | 95.7 | 2.3 | 3.0 |

[a]Surface ratio calculated as $(S^{Pd/ACC}_{Pd} - S^{PdCu/ACC}_{Pd})/S^{PdCu/ACC}_{Pd}$.
[b]Reaction Conditions: Flow experiments, nitrate concentration in distilled water - (1.82 mmol/l), 25° C., reaction volume (V$_R$) 0.028 l; W$_{cat}$ 2.2 g, pH 6.5, hydrogen pressure 6 bar; liquid flow rate F 0.3 l/h, reaction time 6 h.

A conclusion from these studies is that to be active (nitrate-to-nitrite reduction step) and selective (nitrite-to-nitrogen reduction step) the surface of supported metal particles must be optimized for surface ratio of connected PdCu to free metal Pd (i.e., surface Cu/Pd m$^2$/m$^2$) so that surface Cu/Pd must be essentially close to ratio $K^{Pd}_{NO2}/K^{PdCu}_{NO3}$, where $K^{Pd}_{NO2}$ is nitrite adsorption constant for Pd catalyst, and $K^{PdCu}_{NO3}$ is nitrate adsorption constant for Pd—Cu catalyst and, therefore, if the surface Cu/Pd metal ratio is close to ~8 m$^2$/m$^2$, the surface is favorable to high-selectivity conversion to nitrogen.

References

Batista J., Pintar A., Ceh M., Kinetics of the catalytic liquid-phase hydrogenation of aqueous nitrate solution, Catal. Lett. 43 (1997) 9.

Daganello F., Liotta L. F., Macaluso A., Venezia A. M., Daganello G., Appl. Catal. B 24 (2000) 265.

Gao W., Guan N., Chen J., Guan X., Jin R., Zeng H., Liu Z., Zhang F., Appl. Catal. B 46 (2003) 341.

Gavagnin R., Biasetto L., Pinna F., Strukul G., Appl. Catal. B 38 (2002) 91.

Horold S. and Vorlop K. D., Catal. Today (1993), 21.

Horold S., Vorlop K. D., Tacke T., Sell M., Development of catalysts for a selective nitrate and nitrite removal from drinking water, Catal. Today 17 (1993) 21.

Kapoor A. and Viraraghavan T., Nitrate removal from drinking water, J. Environ. Eng. 4 (1997) 371.

Kralic M. and Biffis A., J. Mol. Catal. A 177 (2001) 113.

Lemaignen L., Tong C., Begon V., Burch R., Chadwick D., Catal. Today 75 (2002) 43.

Matatov-Meital Y., Barelko V., Yuranov I., Sheintuch M., Cloth catalysts in water denitrification I. Pd on glass fibers, Applied Catalysis B: Environmental 27 (2000) 127-135.

Matatov-Meytal Yu., Barelko V., Yuranov I., Kiwi-Minsker L., Renken A., Sheintuch M., Appl. Catal. B 31 (2001) 233.

Matatov-Meytal Y., Shindler Y., Sheintuch M., Appl. Catal. B 45 (2003) 127.

Matatov-Meytal U. and Sheintuch M., in: Proceedings of the First International Symposium on Carbon for Catalysis—CarboCat, Lausanne, Switzerland, 18-20 Jul. 2004.

Matatov-Meital Y. and Sheintuch M., Activated carbon cloth-supported pd-cu catalyst: Application for continuous water denitrification, Catalysis Today, 102-103 (2005) 121-127.

Matatov-Meytal U., Ind. Eng. Chem. Res., 44 (2005) 9575.

Matatov-Meytal U., and M. Sheintuch, Catal. Comm., 10 (2009) 1137-1141.

Pintar A., Batista J., Levec J., Potential of mono- and bimetallic catalysts for liquid-phase hydrogenation of aqueous nitrate solution, Water Sci. Technol. 37 (1998) 177.

Pintar A., Setinc M., Levee J., Kajiuchi T., J. Catal. 174 (1998) 72.

Prusse M., Horold S., Vorlop K. D., Effect of the preparation conditions on catalytic properties of bimetallic catalyst for nitrate removal from water, Chem. Ing. Technol. 69 (1997) 93.

Prusse M. and Vorlop K. D., J. Mol. Catal. A 173 (2001) 313.

Shindler Y, Matatov-Meytal Yu., Sheintuch M., Wet Hydrodechlorination of p-Chlorophenol using Pd Supported on Activated Carbon Cloths, Ind. Eng. Chem. Res., 40 (2001) 3301.

Strukul G., Pinna F., Marella M., Maregalli L., Tomaselli M, Sol-gel Pd catalysts for nitrate/nitrite removal from drinking water, Catal. Today 27 (1996) 209.

Vorlop K. D. and Prusse M., Catalytic removing nitrate from water, Catal. Sci. Ser. 1 (1999) 195.

Yoshinaga Y., Akita T., Mikami I., Okura T., J. Catal. 207 (2002) 37.

The invention claimed is:

1. A bimetallic catalytic cloth comprising activated carbon cloth, on the surface of which are nanoparticles comprising a bimetallic Pd—Cu metal, wherein the bimetallic catalytic cloth comprises about 1 wt % Pd and about 0.35-0.45 wt % Cu and has a surface Cu/Pd metal ratio of about 8-10 $m^2/m^2$.

2. The bimetallic catalytic cloth according to claim 1, comprising 1% Pd and 0.35% Cu.

3. The bimetallic catalytic cloth according to claim 1, comprising 1% Pd and 0.45% Cu.

4. The bimetallic catalytic cloth according to claim 1, having a surface Cu/Pd metal ratio of about 8 $m^2/m^2$.

5. A method for the preparation of a bimetallic catalytic cloth according to claim 1, comprising the steps of:
   (i) incipient wetness impregnation of activated carbon cloth (ACC) with an aqueous solution of palladium (II) nitrate to form an impregnated cloth, drying, calcining and reducing the impregnated cloth under flowing hydrogen, thus obtaining a monometallic Pd/ACC cloth; and
   (ii) sputter deposition of a solution of copper formate on the Pd/ACC cloth of step (i) to obtain a bimetallic catalytic cloth, and drying.

6. The method according to claim 5, wherein, after the impregnation in step (i), the impregnated cloth is left at room temperature for about 6 h, dried during about 12 h at 70° C., calcined at about 300° C. in flowing nitrogen, and reduced at about 200° C. under flowing hydrogen.

7. The method according to claim 5, wherein in step (ii) the solution of copper formate is sputtered on the monometallic Pd/ACC catalytic cloth obtained in step (i), the bimetallic catalytic cloth is left at room temperature for about 12 h, dried during about 12 h at 100° C., calcined at about 300° C. in flowing nitrogen, washed and dried overnight at about 90° C. under nitrogen.

8. A method for denitrification of wastewater with selective reduction of nitrate to nitrogen, comprising contacting the waste water with a bimetallic catalytic cloth of claim 1.

9. The bimetallic catalytic cloth according to claim 2, having a surface Cu/Pd metal ratio of about 8 $m^2/m^2$.

10. The bimetallic catalytic cloth according to claim 3, having a surface Cu/Pd metal ratio of about 8 $m^2/m^2$.

11. The method according to claim 8, wherein the nitrate in wastewater is converted to nitrogen in the range 98.4% to 98.9%.

12. The method according to claim 8, wherein the nitrate is converted simultaneously to less than 0.2% nitrite and less than 1.4% ammonia.

* * * * *